(12) United States Patent
Hoffmire et al.

(10) Patent No.: US 6,257,988 B1
(45) Date of Patent: Jul. 10, 2001

(54) DEVICE AND METHOD FOR FITTING FINGER HOLES IN A BOWLING BALL AND THE BOWLING BALL RESULTING THEREFROM

(76) Inventors: Carl Hoffmire, 1407 Nancy Dr., Croydon, PA (US) 19021; Bruce Cobb, 3973 Gloucester Ct., Bensalem, PA (US) 19020

( * ) Notice: Subject to any disclaimer, the term of this patent is extended or adjusted under 35 U.S.C. 154(b) by 0 days.

(21) Appl. No.: 09/404,697

(22) Filed: Sep. 24, 1999

(51) Int. Cl.[7] .............................. A63B 37/00; G01B 5/00
(52) U.S. Cl. .......................... 473/127; 473/129; 33/509; 144/24.09
(58) Field of Search ...................... 473/125, 127, 473/128, 129; 33/509, 510; 144/24.09

(56) References Cited

U.S. PATENT DOCUMENTS

| | | | |
|---|---|---|---|
| 2,314,811 | * | 3/1943 | Akin . |
| 2,393,908 | * | 1/1946 | Hubbard . |
| 2,539,918 | * | 1/1951 | McLaren . |
| 2,566,511 | * | 8/1951 | Bassi . |
| 3,081,549 | * | 3/1963 | Neary . |
| 3,081,550 | * | 3/1963 | Jacksich et al. . |
| 3,145,479 | * | 8/1964 | Rassner . |
| 3,273,250 | * | 9/1966 | Egger . |
| 3,383,109 | * | 5/1968 | Jankiewicz . |
| 3,835,545 | * | 9/1974 | Taylor . |
| 3,861,681 | * | 1/1975 | Kelsey . |
| 4,067,110 | * | 1/1978 | Amelio . |

* cited by examiner

Primary Examiner—William M. Pierce
(74) Attorney, Agent, or Firm—LaMorte & Associates

(57) ABSTRACT

A system and method for producing a bowling ball, where the thumb hole and finger holes in the bowling ball are angled to accurately match the anatomical requirements of the bowler's hand. The system includes a measuring jig assembly for obtaining data on where to drill finger holes in a bowling ball. The measuring jig assembly has holes for the thumb, the middle finger and the ring finger. The position of the thumb hole can be moved in a unique manner so that the thumb hole need not be located below the middle finger hole and the ring finger hole. Furthermore, the angle at which each of the holes enters the measuring jig assembly is adjustable across a range of motion that mimics that achievable by the tips of the thumb, middle finger and ring finger of a bowler. Accordingly, the holes can be adjusted to unique angles required by a particular bowler's hand anatomy. The data retrieved from the measuring jig assembly is then used to produce a bowling ball customized to a bowler's hand.

11 Claims, 6 Drawing Sheets

DEVICE AND METHOD FOR FITTING FINGER HOLES IN A BOWLING BALL AND THE BOWLING BALL RESULTING THEREFROM

BACKGROUND OF THE INVENTION

1. Field of the Invention

In general, the present invention relates to devices and methods of fitting and drilling finger holes in a bowling ball. More particularly, the present invention relates to bowling ball fitting devices that enable the holes for the thumb to be drilled in numerous different orientations with respect to the holes for the middle and ring fingers.

2. Description of the Prior Art

A regulation bowling ball contains three finger holes. Typically, a bowler grasps the holes in the bowling ball with his/her middle finger, ring finger and thumb. However, every person has a uniquely shaped hand and fingers. Furthermore, every bowler has their own unique bowling style that is affected by the position of their fingers as they grasp and roll the bowling ball. It is for this reason that bowling balls are not manufactured with holes. Rather, bowling balls are manufactured as solid spheres. The finger holes are drilled into a bowling ball in a secondary procedure at the time of purchase of the bowling ball.

To drill a hole in a bowling ball, the purchaser of the bowling ball is first fitted. In the fitting procedure, a person's hand is placed within a fitting jig. The fitting jig contains adjustable finger holes so that a person can customize the position of the finger holes to their needs. Once a person is comfortable with the holes on the bowling ball, the settings measured from the fitting jig can be transferred to a drilling machine and the desired finger holes can be reproduced in an actual bowling ball.

In many prior art fitting jigs, the degree of adjustability is limited. Many traditional fitting jigs contain only adjustments for the middle finger and the ring finger. The position of the thumb hole is static. Such prior art devices are exemplified by U.S. Pat. No. 5,601,385 to Towers, entitled, Apparatus For Fitting and Drilling Bowling Balls.

The static position of thumb holes in many prior art fitting jigs is insufficient for many bowlers. Certain bowlers require and/or desire finger hole configurations where the position of the thumb hole can also be varied. Accordingly, in the prior art, some fitting jigs have been developed where the position of the thumb hole can be altered. Such prior art fitting jigs are exemplified by U.S. Pat. No. 4,067,110 to Amelio, entitled Thumb Finger Hole Positioning Device For Bowling Balls.

Although fitting jigs, such as is shown in the Amelio patent, are better than prior art static thumb hole fitting jigs, such fitting jigs still are not sufficient for many bowlers. In the Amelio patent, the thumb hole jig cannot be adjusted along the curved surface of the bowling ball. Rather, the thumb jig can only be adjusted along a linear path. Furthermore, the thumb hole jigs adjust about a pivot point that is deep within the bowling ball fitting jig. However, a thumb enters a bowling ball from the surface of the bowling ball, and pivots near the surface of the bowling ball. Do to the different points of pivotal rotation, the angles achievable by a person's thumb cannot be accurately matched by the thumb hole jig.

Prior art fitting jigs for bowling balls therefore are still not capable of accurately fitting a bowler's fingers with anatomically correct precision. Rather, prior art fitting jigs still require compromises in finger position which may cause discomfort and/or inaccuracy to the bowler.

A need therefore exists for an improved fitting jig for a bowling ball that can provide a wide variety of finger and thumb positional adjustments in an anatomically correct manner. This need is met by the present invention system and method as described and claimed below.

SUMMARY OF THE INVENTION

The present invention is a system and method for producing a bowling ball, where the thumb hole and finger holes in the bowling ball are angled to accurately match the anatomical requirements of the bowler's hand. The system includes a measuring jig assembly for obtaining data on where to drill finger holes in a bowling ball. The measuring jig assembly has holes for the thumb, the middle finger and the ring finger. The position of the thumb hole can be moved in a unique manner so that the thumb hole need not be located below the middle finger hole and the ring finger hole. Furthermore, the angle at which each of the holes enters the measuring jig assembly is adjustable across a range of motion that mimics that achievable by the tips of the thumb, middle finger and ring finger. Accordingly, the holes can be adjusted to unique angles required by a particular bowler's hand anatomy. The data retrieved from the measuring jig assembly is then used to produce a bowling ball customized to a bowler's hand.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
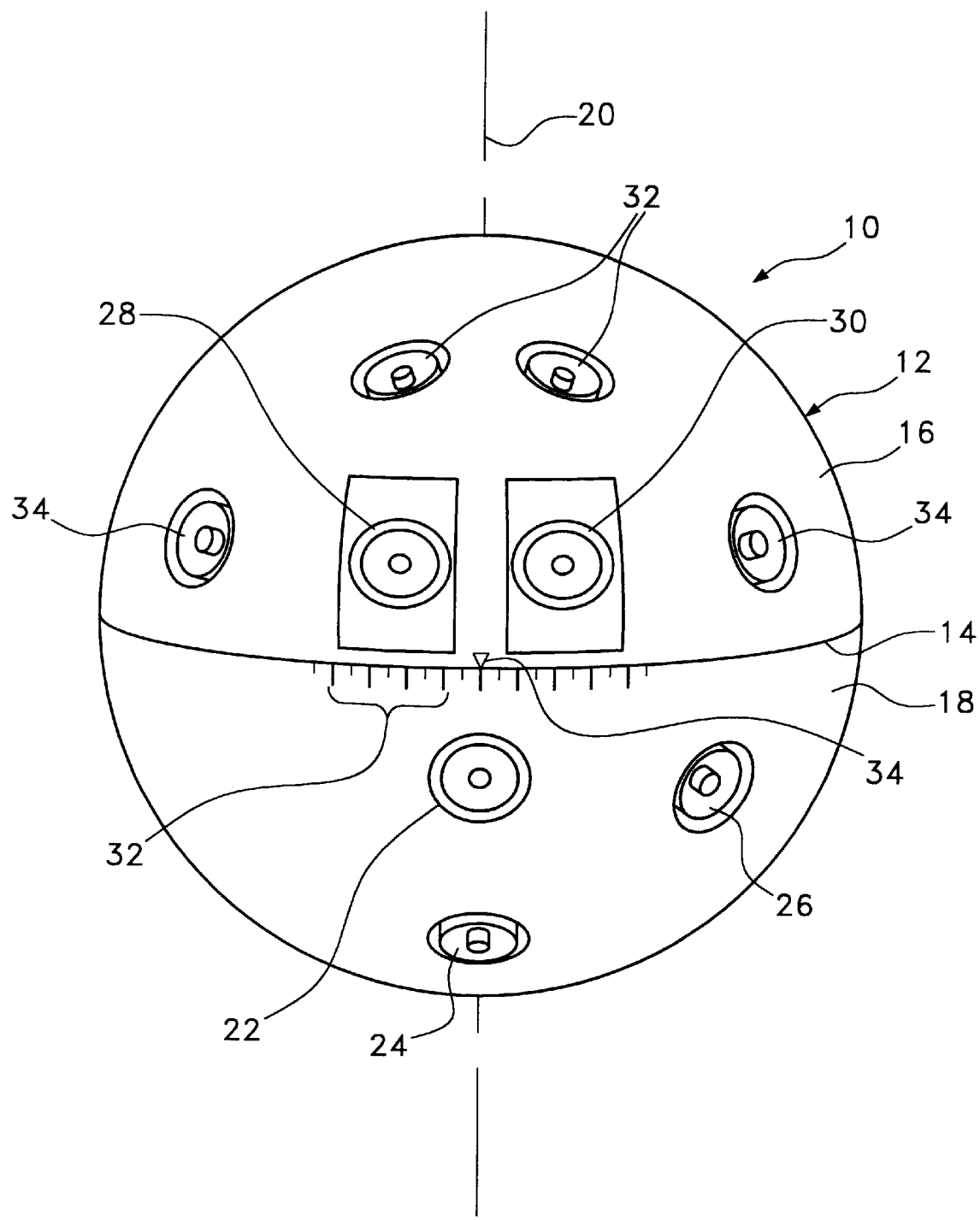
FIG. 1 is a front view of an exemplary embodiment of a bowling ball finger hole fitting jig in accordance with the present invention.

Referring to FIG. 1, an exemplary embodiment of a bowling ball fitting jig 10 is shown. The bowling ball fitting jig 10 has a spherical housing 12 that is the same overall shape as a bowling ball. The spherical housing 12 is divided into two separate hemispheres 16, 18 that align along a common equatorial joint 14. Internally within the housing 12, the two hemispheres 16, 18 are joined together along a common axis 20 that runs perpendicular to the plane of the equatorial joint 14. Each hemisphere 16, 18 is capable of independently rotating around the common axis 20. Accordingly, the rotational position between the two hemispheres 16, 18 can be altered as desired.

On the lower hemisphere 18 is located a thumb hole assembly 22. The thumb hole assembly 22 contains a cylindrical structure having an open end on the curved surface of the lower hemisphere 18. Adjustment knobs 24, 26 are also disposed on the lower hemisphere 18. The adjustment knobs 24, 26 are used to adjust the orientation of the thumb hole assembly 22, as will later be explained.

Two finger hole assemblies 28, 30 are located on the upper hemisphere 16 of the spherical housing 12. The finger hole assemblies 28, 30 are used to position the ring finger and the middle finger of the bowler being fitted. Adjustment knobs 32, 34 are located on the upper hemisphere 16. The adjustment knobs 32, 34 are used to adjust the orientation of the finger hole assemblies 28, 30, as will also be later explained.

Gauge markings 33 are located on at least one side of the equatorial joint 14 between the upper hemisphere 16 and the lower hemisphere 18 of the spherical housing 12. A position icon 35 is opposed to the gauge markings 32 on the opposite hemisphere. As the lower hemisphere 18 and the upper hemisphere 16 are rotated relative to each other, about the central axis 20, the degree of rotation between the two hemispheres 16, 18 can be quantified by the location of the position icon 35 relative the gauge markings 33.

As the two hemispheres 16, 18 are rotated relative to each other, the relative positions of the finger hole assemblies 28, 30 and the thumb hole assembly 22 change. However, regardless of the change in position, the thumb hole assembly 22 remains on the curved exterior of the spherical housing 12.

Figure 2:
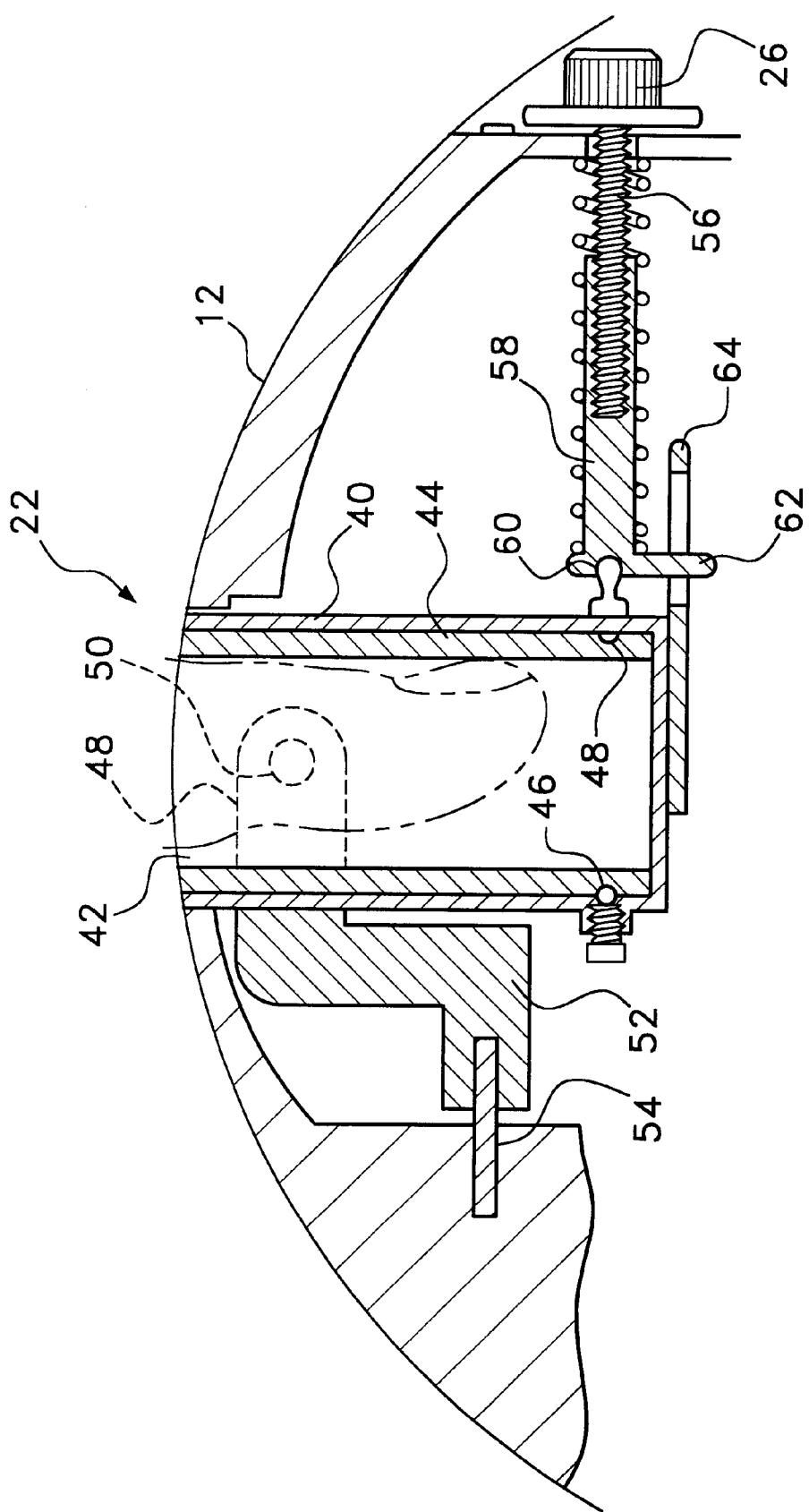
FIG. 2 is cross-sectional view of the thumb hole assembly from the embodiment shown in FIG. 1.

Referring to FIG. 2, a first embodiment of the workings of the thumb hole assembly 22 is shown. The thumb hole assembly 22 includes a cylindrical tube 40 that extends into the spherical housing 12. The cylindrical tube 40 has an open top end 42. An annular thumb insert 44 is placed within the cylindrical tube 40 through its open top end 42. When fitting a bowler, an annular thumb insert 44 of the proper size is selected and inserted into the cylindrical tube 40, prior to the positional adjustments of the thumb hole assembly 22. The annular thumb insert 44 is retained in the cylindrical tube 40 by a spring biased locking ball 46, which engages a corresponding groove 47 on the exterior of the annular thumb insert 44.

Figure 3:
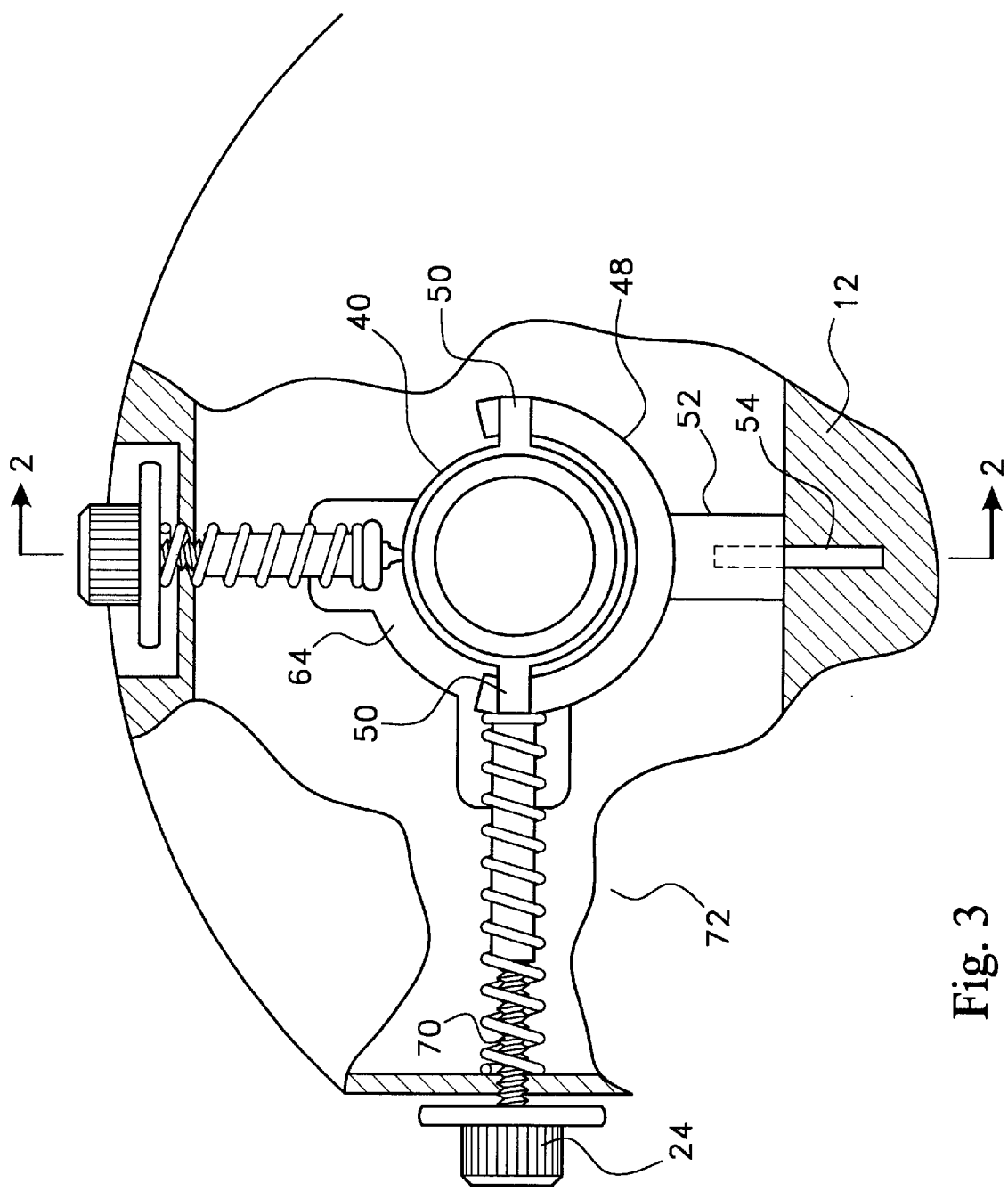
FIG. 3 is a fragmented top view of the thumb hole assembly shown in FIG. 2.

Referring to FIG. 3, in conjunction with FIG. 2, it can be seen that the cylindrical tube 40 is supported by a gimbal system. The gimbal system includes a yoke 48. The yoke 48 is a U-shaped element that extends around the cylindrical tube. Pivot arms 50 radially extend from opposite sides of the cylindrical tube 40. The pivot arms 50 engage the yoke 48 in a manner that enables the pivot arms 50 to rotate freely within the yoke 48. Accordingly, the pivot arms 50 act as an axle, wherein the cylindrical tube 40 is free to swing about that axle.

The yoke 48 of the gimbal system is supported by a bracket element 52. The bracket element 52 is pivotably connected to the spherical housing 12, via a pivot pin 54. Accordingly, the bracket element 52 and the yoke 48 it supports can rotate freely about the pivot pin 54.

Looking now solely at FIG. 2, it can be seen that when a bowler has his/her hand fitted, that bowler places his/her thumb into the thumb hole assembly 22. As a person's thumb enters the thumb hole assembly 22, the thumb bends at the joint between the middle and distal phalange of the thumb. As such, the thumb, pivots about that joint within the thumb hole assembly 22. Typically, when bowling, a bowler will place their thumb in a bowling ball to a point where the thumb joint between the middle and distal phalange is slightly below the exterior surface of the bowling ball. The pivot arms 50 that extend from the cylindrical tube 40 are positioned to correspond to the joint of the thumb, when the thumb is placed into the thumb hole assembly 22. Accordingly, the cylindrical tube 40 is free to pivot at approximately the same position as is the bowler's thumb. The cylindrical tube 40 can therefore pivot with the thumb in an anatomically correct manner.

If a person's thumb move sideways, outside the range of motion provided by the pivot arms 50, then the entire yoke 48 moves about the pivot pin 54. Thus, referring to FIG. 2, it can be seen that the gimbals system enables the cylindrical tube to rotate about the pivot arms 50 in the plane of the paper. The gimbals system also enables the cylindrical tube 40 to rotate about the pivot pin 54 in a plane perpendicular to the plane of the paper. The combined freedom of movement enables the cylindrical tube 40 to align with the natural anatomically correct position of the bowler's thumb.

Movement of the cylindrical tube 40 is controlled by adjustment knobs. In FIG. 2, it can be seen that a first adjustment knob 26 is attached to a threaded shaft 56. The threaded shaft 56 engages an internally threaded shaft 58. The internally threaded shaft 58 engages the cylindrical tube 40, via a universal joint 60, such as a ball and socket joint. A guide pin 62 extends downwardly from the universal joint 60. The guide pin 62 rides in a slot of a guide bracket 64. The guide bracket 64 is rigidly affixed to the cylindrical tube 40. As the first adjustment knob 26 is turned, the bottom of the cylindrical tube 40 is rotated about the pivot arms 50. The presence of the guide pin 62 in the guide bracket 64 ensures that the force applied by the first adjustment knob 26 acts in the proper direction on the cylindrical tube 40.

The first adjustment knob 26 is calibrated. As such, the effect of the first adjustment knob 26 on the cylindrical tube 40 is known for any rotational position of the first adjustment knob 26. Once the cylindrical tube 40 is adjusted to a proper position for a particular bowler, the reading from the first adjustment knob 26 can be recorded and entered into a bowling ball drilling machine.

Referring to FIG. 3, it can be seen that a second adjustment knob 24 also engages the cylindrical tube 40. The second adjustment knob 24 is attached to an externally threaded shaft 70. The externally threaded shaft 70 engages an internally threaded shaft 72, wherein the rotation of the adjustment knob 24 makes the combined length of the externally threaded shaft 70 and the internally threaded shaft 72 either longer or shorter. The internally threaded shaft 72 engages the cylindrical tube 40, via a universal joint, such as a ball and socket joint, as was previously described. The movement of the universal joint (not shown) is guided by the presence of a guide pin (not shown) in a slot of a guide bracket 64. This operation was also previously described.

As the second adjustment knob 24 is turned, the cylindrical tube 40 and the yoke 48 that supports the cylindrical tube 40 are rotated about pivot pin 54. The second adjustment knob 24 is calibrated. As such, the effect of the second adjustment knob 24 on the cylindrical tube 40 is known for any rotational position of the second adjustment knob 24. Once the cylindrical tube 40 is adjusted to a proper position for a particular bowler, the reading from the second adjustment knob 24 can also be recorded and entered into a bowling ball drilling machine.

Figure 4:
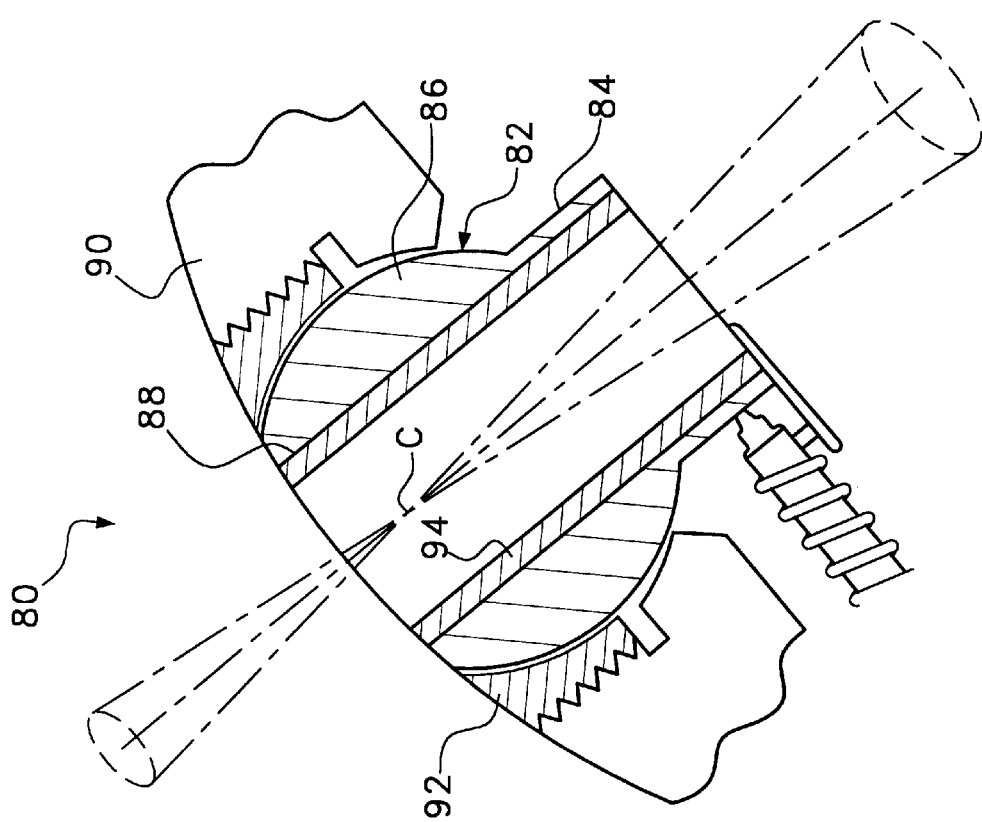
FIG. 4 is a cross-sectional view of an alternate embodiment of a thumb hole assembly.

Referring now to FIG. 4, an alternate embodiment of a thumb hole assembly 80 is disclosed. In this embodiment, the previously described tubular shaft is replaced with a jig element 82 that has a cylindrical lower section 84 and a spherical upper section 86. A tubular shaft 88 extends down the center of the jig element 82. A socket relief is formed in the spherical housing 90. An annular collar 92 engages the spherical housing 90 above the jig element 82, thereby locking the spherical upper section 86 of the jig element 82 in an enclosed socket cavity. The spherical upper section 86 of the jig element 82 is free to move within the enclosed socket cavity. Accordingly, the jig element 82 acts as the ball in a ball-and-socket joint.

The rotational movement of the jig element 82 is centered around a center of rotation C. The center of rotation C is positioned at the same depth as the pivot arms 50 in the embodiment of FIG. 2. Accordingly, when a person places their thumb in the thumb hole assembly 80, the joint of the thumb lays near the center of rotation C.

The tubular shaft 88 that extends down the center of the jig element retains an annular thumb insert 94 in the same manner as was previously described with regard to the embodiment shown in FIG. 2 and FIG. 3. Adjustments to the position of the jig element 82 are also made using the same adjustment knob subassemblies that were previously described with regard to the embodiment shown in FIG. 2 and FIG. 3.

Figure 5:
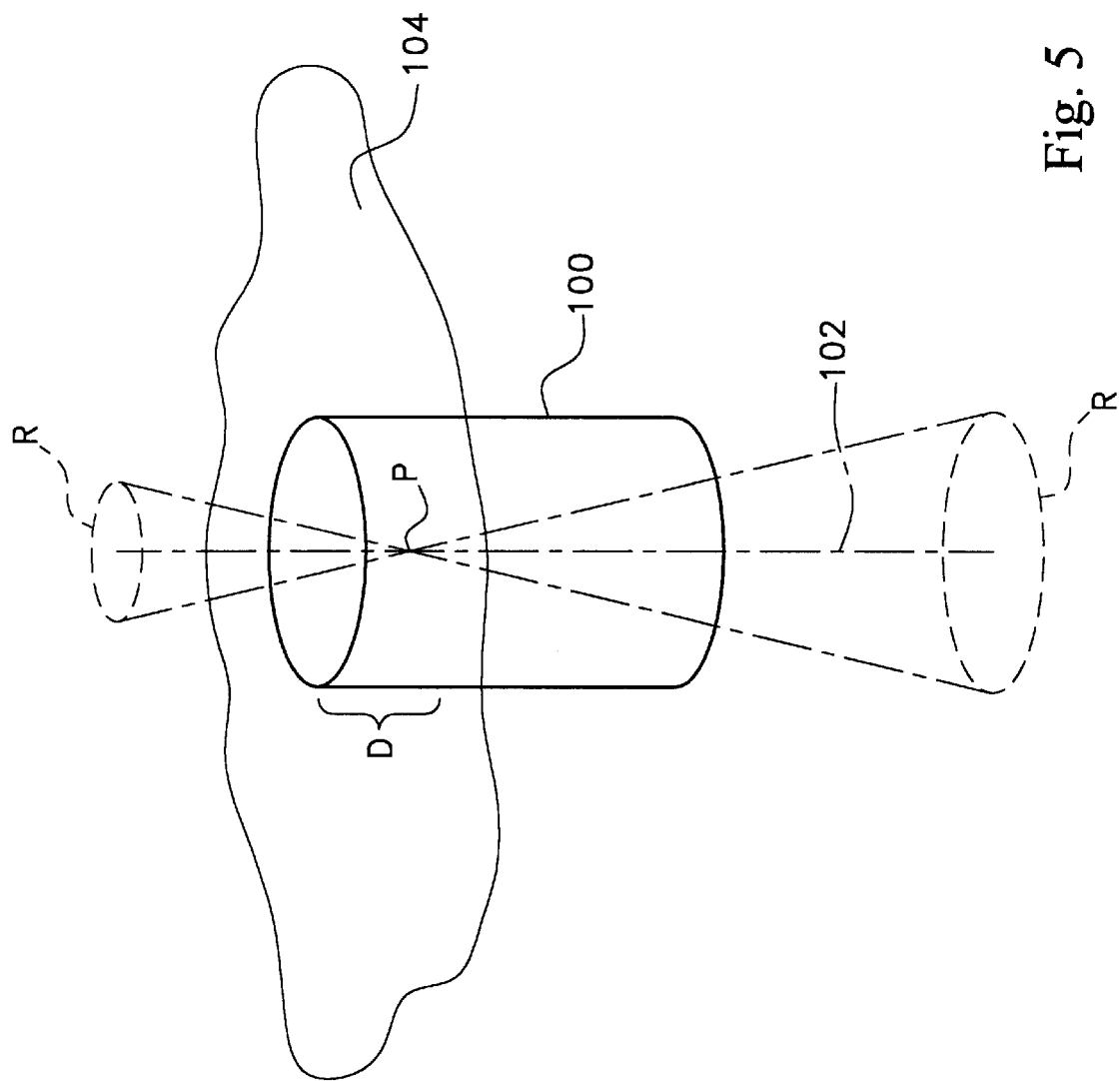
FIG. 5 is a schematic view of a finger/thumb hole assembly showing range of movement.

Referring to FIG. 5, it will be understood that embodiments of the thumb hole assemblies previously described are merely exemplary. The thumb hole assembly, in accordance with the present invention, can have any configuration that enables the thumb hole assembly to have the range of movement shown in FIG. 5. The embodiments of the thumb hole assembly previously described show possible configurations for allowing the range of movement shown in FIG. 5.

In FIG. 5, a schematic of a thumb hole structure 100 is shown. The thumb hole structure 100 is centered around a central axis 102. On the central axis 102 is a fixed pivot point P. The pivot point P is a predetermined distance D below the exterior surface of the spherical housing 104. The predetermined distance is preferably between ⅛ inch and 1 inch so as to correspond with the anatomical position of the joint on the thumb. The thumb hole structure 100 can be mounted within the spherical housing 104 in any manner that enables the central axis 102 of the thumb hole structure to freely move about the pivot point P within the shown conical range R, wherein the pivot point P is at the apex of the conical range R.

Until this point in the description, all means for adjustment have been applied to the thumb hole of the bowling ball fitting jig. As has been previously stated, the bowling ball fitting jig also has fitting holes for a bowlers ring finger and middle finger. The fitting holes for the ring finger and middle finger can be traditional fitting holes used in the prior art. However, it is preferred that the same range of motion provided to the thumb hole be adapted for use with the ring finger and middle finger holes. Accordingly, the range of movement and adjustments previously described for the thumb fitting hole can also be applied to the finger fitting holes. Accordingly, the range of motion shown in FIG. 5 can also be obtained at both the finger fitting hole for the ring finger and the finger fitting hole for the middle finger.

Returning to FIG. 1, it will now be understood that to use the bowling ball fitting jig 10, a person adjusts the distance between the thumb hole assembly 22, the middle finger assembly 28 and the ring finger assembly 30 to the requirements of the bowler's hand. As part of the adjustment, the thumb hole assembly 22 can be rotated out of alignment with the finger hole assemblies 28, 30 by rotating the lower hemisphere 18 of the spherical housing 12 in relation to the upper hemisphere 16 of the spherical housing 12.

After the desired offset of the thumb hole assembly 22 is obtained and the general distance between the thumb hole assembly 22 and finger hole assemblies 28, 30 is achieved, a bowler places his/her thumb into the thumb hole assembly 22 and places his/her fingers into the finger hole assemblies 28, 30. Once the thumb is in the thumb hole assembly 22, the orientation of the thumb hole assembly 22 is adjusted to match the anatomically correct orientation of the bowler's thumb. Consequently, the thumb lies naturally in the thumb hole assembly 22. Once the thumb hole assembly 22 is adjusted appropriately, the readings from the adjustment knobs 24, 26 of the thumb hole assembly are recorded for later use in a bowling ball drilling machine.

The process for fitting a bowler's fingers into the finger hole assemblies 28, 30 is the same as the process just described for fitting the thumb. The middle finger and ring finger are placed within the finger hole assembles 28, 30. After the finger hole assemblies 28, 30 are adjusted for distance, as is traditional, the orientation of the finger hole assemblies 28, 30 is then adjusted to match the anatomically correct orientation of the bowler's fingers. Consequently, the tip of the middle finger and ring finger lay naturally in the finger hole assemblies 28, 30. Once the finger hole assemblies 28, 30 are adjusted appropriately, the readings from the adjustment knobs 32, 34 of the finger hole assemblies 28, 30 are recorded for later use in a bowling ball drilling machine.

Figure 6:
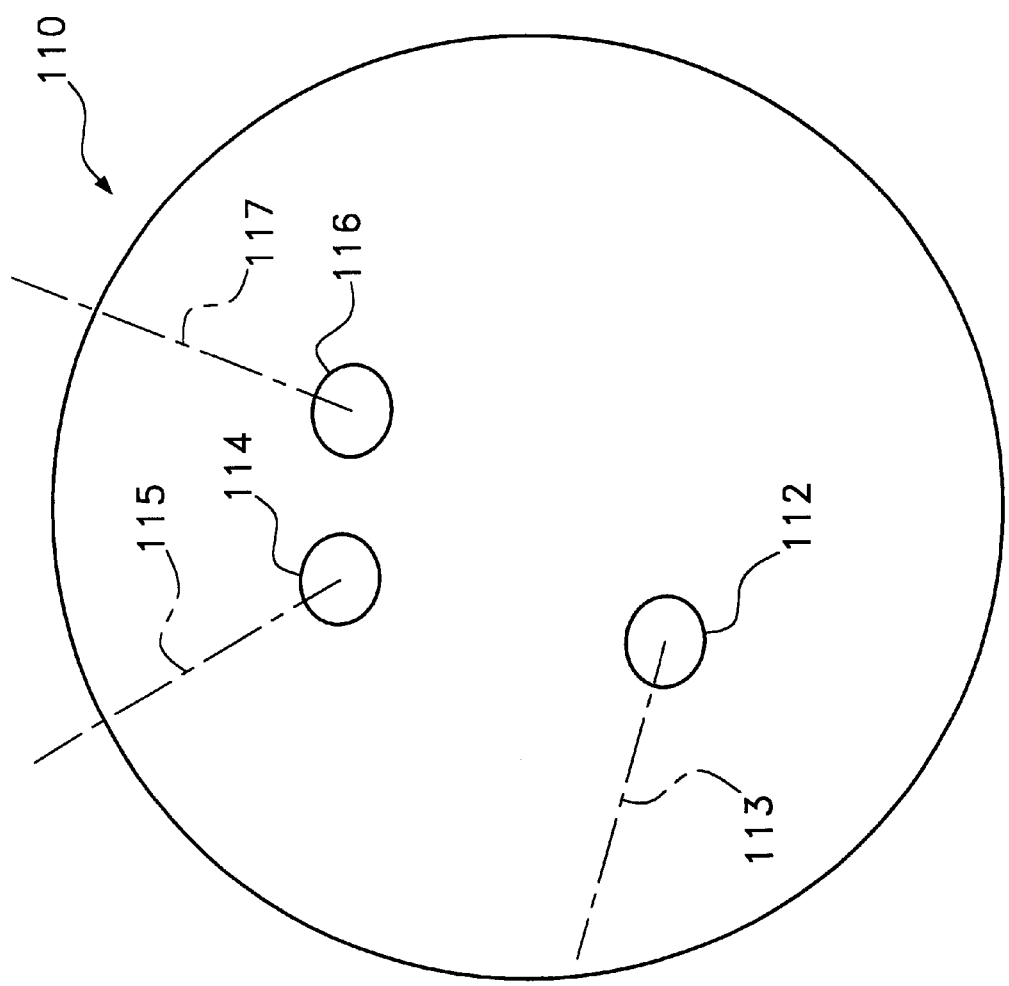
FIG. 6 shows a bowling ball in accordance with the present invention.

Referring to FIG. 6, there is shown a bowling ball 110 that has been drilled using data obtained from the bowling ball fitting jig previously described. The bowling ball 110 includes a thumb hole 112, a middle finger hole 114 and a ring finger hole 116. The thumb hole, middle finger hole and ring finger hole each has their own unique central axis 113, 115, 117, respectively. The central axis for the different holes need not be in line with the geometric center of the bowling ball. Furthermore, the central axis for the different holes need not have any orientational correspondence to one another. Rather, the various holes can progress in any direction within the bowling ball 110, provided the direction selected corresponds with the natural anatomical orientation of the bowler's fingers.

The combination of a thumb hole in a bowling ball that is not aligned under the finger holes along with holes that are aligned anatomically correctly forms a grip, herein referred to as the Max-Y Grip.

It will be understood that the embodiments of the present invention described and illustrated herein are merely exemplary and a person skilled in the art can make many variations to the embodiments shown without departing from the scope of the present invention. All such variations, modifications and alternate embodiments are intended to be included within the scope of the present invention as defined by the appended claims.

What is claimed is:

1. A bowling ball finger hole measuring device, comprising:

a curved surface having a first section and a second section, wherein said first section and said second section can be moved relative each other throughout a predetermined range while maintaining said curved surface;

a thumb hole jig disposed in said first section of said curved surface, said thumb hole jig defining a cylindrical opening with a thumb hole central axis that enters said first section of said curved surface at a first predetermined angle, wherein said first predetermined angle is adjustable about a point on said thum hole central axis that is between ⅛ inch and 1 inch below said curved surface;

two thumb hole adjustment mechanisms that engage said thumb hole jig below said curved surface, a first of said thumb hole adjustment mechanisms capable of reciprocally rotating said thumb hole jig about said point on said thumb hole central axis in a first direction and a second of said thumb hole adjustment mechanisms capable of reciprocally rotating said thumb hole jig about said point on said thumb hole central axis in a second direction that is perpendicular to said first direction;

a middle finger hole jig disposed in said second section of said curved surface, said middle finger hole jig defining a cylindrical opening with a middle finger central axis that enters said second section of said curved surface at a second predetermined angle, wherein said second predetermined angle is adjustable about a point on said middle finger central axis that is between 1/8 inch and 1 inch below said curved surface;

two middle finger hole adjustment mechanisms that engage said middle finger hole jig below said curved surface, a first of said middle finger hole adjustment mechanisms capable of reciprocally rotating said middle finger hole jig about said point on said middle finger central axis in a first direction and a second of said middle finger hole adjustment mechanisms capable of reciprocally rotating said middle finger hole jig about said point on said middle finger central axis in a second direction that is perpendicular to said first direction;

a ring finger hole jig disposed in said second section of said curved surface, said ring finger hole jig defining a cylindrical opening with a ring finger central axis that enters said second section of said curved surface at a third predetermined angle, wherein said third predetermined angle is adjustable about a point on said ring finger central axis that is between 1/8 inch and 1 inch below said curved surface;

two ring finger hole adjustment mechanisms that engage said ring finger hole jig below said curved surface, a first of said ring finger hole adjustment mechanisms capable of reciprocally rotating said ring finger hole jig about said point on said ring finger central axis in a first direction and a second of said ring finger hole adjustment mechanisms capable of reciprocally rotating said ring finger hole jig about said point on said ring finger central axis in a second direction that is perpendicular to said first direction; and a gauge disposed between said first section and said second section for quantifying any position between said first section and said second section within said predetermined range.

2. The device according to claim 1, wherein said curved surface is configured as a segment of a bowling ball.

3. The device according to claim 1, wherein said gauge includes distance markings and a position indicator disposed on said curved surface, wherein said position indicator points to different points along said distance markings as said first section of said curved surface moves in relation to said second section of said curved surface.

4. A bowling ball finger hole measuring device, comprising:

a curved surface having at least three finger holes disposed therein, each of said finger holes being symmetrically disposed around a central axis that extends into said curved surface at a predetermined angle, wherein said predetermined angle of each of said finger holes is adjustable about a predetermined rotation point on its central axis that is between 1/8 inch and 1 inch below said curved surface;

an independent set of adjustment mechanisms for each of said finger holes, wherein each set of adjustment mechanisms includes a first adjustment mechanism for reciprocally rotating a finger hole about its rotation point in a first direction and a second adjustment mechanism for reciprocally rotating said that finger hole about its rotation point in a second direction that is perpendicular to said first direction.

5. The device according to claim 4, wherein said curved surface is configured as a bowling ball.

6. The device according to claim 4, wherein said finger holes include a thumb hole, a middle finger hole and a ring finger hole and said curved surface includes an upper section and a lower section.

7. The device according to claim 6, wherein said thumb hole is disposed in said lower section of said curved surface and both said middle finger hole and said ring finger hole are disposed in said upper section of said curved surface, wherein said upper section of said curved surface and said lower section of said curved surface are moveable relative to one another across a predetermined range.

8. The device according to claim 7, further including a gauge disposed between said upper section and said lower section of said curved surface for quantifying any position between said first section and said second section within said predetermined range.

9. A bowling ball finger hole measuring device, comprising:

a curved surface having a first section and a second section that can be rotated relative each other while maintaining said curved surface;

three adjustable finger holes disposed in said curved surface, wherein one of said finger holes is in said first section of said curved surface and two of said finger holes are in said second section of said curved surface;

six manual adjustment mechanisms accessible on said curved surface, two of said adjustment mechanisms engage each of said finger holes, wherein of the two adjustment mechanisms that engage each finger hole, one adjustment mechanism moves the finger hole in a first direction and the second adjustment mechanism moves that same finger hole in a second direction that is perpendicular to said first direction.

10. The device according to claim 9, wherein each of said adjustment mechanisms has a calibrated gauge visible on said curved surface, wherein said calibrated gauge indicates the position of the finger hole controlled by that adjustment mechanism.

11. The device according to claim 9, wherein each of said finger holes has a central axis that descends into said curved surface at a predetermined angle, and said predetermined angle is adjustable about a predetermined rotation point on said central axis that is between 1/8 inch and 1 inch below said curved surface.

* * * * *